United States Patent [19]

Suga et al.

[11] Patent Number: 5,764,848

[45] Date of Patent: Jun. 9, 1998

[54] IMAGE RECORDING APPARATUS HAVING AN IMAGE PICK-UP DEVICE

[75] Inventors: Akira Suga, Tokyo; Akihiko Tojo; Seiji Hashimoto, both of Kanagawa-ken, all of Japan

[73] Assignee: Canon Kabushiki Kaisha, Tokyo, Japan

[21] Appl. No.: 158,840

[22] Filed: Nov. 29, 1993

Related U.S. Application Data

[63] Continuation of Ser. No. 4,207, Jan. 13, 1993, abandoned, which is a continuation of Ser. No. 935,679, Aug. 25, 1992, abandoned, which is a continuation of Ser. No. 793,285, Nov. 12, 1991, abandoned, which is a continuation of Ser. No. 535,989, Jun. 8, 1990, abandoned, which is a continuation of Ser. No. 374,620, Jun. 29, 1989, abandoned, which is a continuation of Ser. No. 154,425, Feb. 5, 1988, abandoned, which is a continuation of Ser. No. 810,522, Dec. 11, 1985, abandoned, which is a continuation of Ser. No. 445,723, Nov. 30, 1982, abandoned.

[30] Foreign Application Priority Data

| Dec. 3, 1981 | [JP] | Japan | 56-194941 |
| Dec. 8, 1981 | [JP] | Japan | 56-197220 |
| Dec. 16, 1981 | [JP] | Japan | 56-203334 |
| Dec. 29, 1981 | [JP] | Japan | 56-215323 |

[51] Int. Cl.$^6$ ............................................. H04N 5/225
[52] U.S. Cl. ................ 386/117; 386/125; 358/906; 358/909.1
[58] Field of Search ..................... 360/31, 35.1, 33.5, 360/60; 358/335, 906, 909, 213.19, 228, 909.1; 386/38, 45, 117, 121, 125, 126

[56] References Cited

U.S. PATENT DOCUMENTS

| 3,576,393 | 4/1971 | Thompson | 358/228 |
| 3,934,161 | 1/1976 | Caywood | 358/213.19 X |
| 4,057,830 | 11/1977 | Adcock | 358/906 X |
| 4,131,919 | 12/1978 | Lloyd et al. | 358/906 X |
| 4,263,623 | 4/1981 | Woo | 358/906 |
| 4,297,012 | 10/1981 | Nakai | 354/412 |
| 4,304,472 | 12/1981 | Shinoda et al. | 354/412 |
| 4,322,753 | 3/1982 | Ishihara | 358/213.19 |
| 4,327,378 | 4/1982 | Tanaka et al. | 358/228 |
| 4,330,796 | 5/1982 | Anagnostopoulos | 358/906 |
| 4,366,501 | 12/1982 | Tsunekawa | 358/906 |
| 4,386,376 | 5/1983 | Takimoto | 358/906 |
| 4,420,773 | 12/1983 | Toyoda | 358/906 |
| 4,517,611 | 5/1985 | Kimura | 358/906 X |
| 4,531,164 | 7/1985 | Maeda et al. | 358/906 X |
| 4,544,959 | 10/1985 | Kozuki et al. | 358/906 X |
| 4,570,188 | 2/1986 | Ichiyanagi | 358/906 X |
| 4,783,707 | 11/1988 | Nemoto et al. | 360/105 X |

*Primary Examiner*—Andrew L. Sniezek
*Attorney, Agent, or Firm*—Anderson Kill & Olick, P.C.

[57] ABSTRACT

In the disclosed picture recording device, an image pick-up arrangement converts an optical image into electric picture information and stores the information. A recording arrangement reads out the electric picture information on the image pick-up arrangement and records the information. A power supply control controls the power supply to the recording arrangement and a memory holds the electric picture information formed on the image pick-up arrangement at the start of the supply of power by the power supply control to the recording arrangement. This allows image information immediately to be picked up when the camera is turned on during the power up of the various camera circuits and thus avoids the loss of image information during the rise time.

15 Claims, 12 Drawing Sheets

IMAGE RECORDING APPARATUS HAVING AN IMAGE PICK-UP DEVICE

This is a continuation of application Ser. No. 08/004,207, filed Jan. 13, 1993, which in turn is a continuation of application Ser. No. 07/935,679, filed Aug. 25, 1992, which in turn is a continuation of application Ser. No. 07/793,285, filed Nov. 12, 1991, which in turn is a continuation of application Ser. No. 07/535,989, filed Jun. 8, 1990, which in turn is a continuation of application Ser. No. 07/374,620, filed Jun. 29, 1989, which in turn is a continuation of application Ser. No. 07/154,425, filed Feb. 5, 1988, which in turn is a continuation of application Ser. No. 06/810,522, filed Dec. 11, 1985, which in turn is a continuation of application Ser. No. 06/445,723, filed Nov. 30, 1982, all now abandoned.

BACKGROUND OF THE INVENTION

1. Field of the Invention

This invention relates to image recording devices for cameras and the like, and particularly to image recording devices with improved rise-time characteristics and less susceptible to the influence of dark current.

2. Description of the Prior Art

Hitherto, in devices in which an image is formed upon the same arrangement that records a picture, such as a silver halide film, a view can be photographed and recorded at a predetermined time only if the shutter is operated immediately after the shutter release.

However, recently, proposals have been made to make the recording medium of magnetic material or ordinary paper. This makes it necessary to furnish an image pick-up arrangement in addition to the recording medium. Also, it is necessary to provide a converting circuit for converting the output signal into a form suitable for recordation and a mechanism for applying the signals to a recording medium or a recording head.

Unless the converting circuit or recording mechanism is separately driven, an ordinary picture recording device with a battery of limited capacity should supply current to the recording circuit or mechanism only when actually needed. That is to say, it is necessary to energize the recording system or the signal processing circuit at each operation by operating, for example, a photographic or recording switch. However, a finite rise time is necessary for energizing the converting circuit or recording mechanism. This produces a delay which often causes the photographer an opportunity to lose a shot.

Moreover, high quality picture recording arrangements using image pick-up devices resent the problem of significant irregular dark current. This dark current occurs during the lapse of time when thermalelectrons are form ed in the image pick-up device, and decrease the signal to noise ratio of the image signal. This dark current becomes irregular due to impurities in the image pick-up element or the traps and decreases the quality of the picture.

An irregular dark current undesirably affects the picture and causes irregular brightness or partial deviation of the color phase. This irregular dark current is a considerable hindrance to a picture recording device intended for high picture quality.

SUMMARY OF THE INVENTION

It is an object of the present invention to provide an energy-saving picture recording device capable of eliminating the short-comings of conventional devices.

It is a more specific object of the invention to limit the time loss caused by the rise time of the recording system and to minimize the irregular dark current.

The present invention is characterized in that during the time after the picture switch is operated until the recording system is energized for operation, information corresponding to at least a one frame picture can be formed on the photoelectric converting type image pick-up arrangement. According to an embodiment of the present invention, a shutter is provided in front of the image pick-up arrangement, information for at least one frame of a picture is obtained, and the shutter is closed after operating the record starting switch or photographic switch. Hence, the picture can be obtained during a predetermined time without waiting for the signal processing circuit or the recording mechanism to elapse.

According to another feature of the invention, the one frame picture information is formed in the light sensing part of the image pick-up arrangement during operation of the switch for driving the recording system and then shifted to a memory so as to hold the picture immediately after operation of the switch.

The one frame picture information obtained immediately after operation of the recording switch is not renewed until a predetermined signal is obtained.

According to another feature of the invention, a storage device is used in the image pick-up element to hold the single frame picture information.

According to yet another feature of the invention, the power switch for the entire image recording device of this invention and the recording switch for starting the operation of the recording system are the same.

According to another feature of the invention, the information in the memory in the light sensing arrangement is applied to the recording system for recording along with stabilization of the recording system.

According to another feature of the present invention, holding one or two frame picture data immediately after operation of the switch for energizing the recording system makes it possible to provide an even margin for the rise time of the recording system.

According to one embodiment of the present invention, the recording mechanism or recording signal processing circuit is made inoperative before operation of the recording switch and this mechanism or circuit becomes operative only after operation of the recording switch, while the charge in the light sensing arrangement of the photoelectric converting type image pick-up element is reset by operation of the recording switch and shifted to the memory to be held after lapse of a predetermined storage time so that, without waiting for the rising up of the recording system, the picture can be obtained immediately after the operation of the recording switch and can be consequently recorded after stabilization of the recording system. In consequence, it is unnecessary always to drive the recording system, but it is necessary only to supply power during each photograph. Hence, significant power can be saved, while the photographic opportunities are not lost.

Further, the device is constructed so that operation of the shutter causes another one-frame picture information to be formed in the light sensing arrangement. Hence, it is possible to memorize information for two picture frames before the rise time of the recording system is completed.

Further, according to another embodiment of the present invention, the light sensing part is shielded till one-frame picture information formed in the light sensing arrangement of the charge transfer type image pick-up device is transferred to the memory in the image pick-up device.

This prevents smear during transfer.

Consequently, it is possible to prolong the transfer time optionally.

Further, in accordance with the present invention, the transfer time is variable so that it is possible to select a transfer time that can even the irregular dark current.

Further, in accordance with the present invention, the frequency of the above transfer signal or the transfer time can be varied in accordance with time till the output is obtained from the facility that detects the energizing of the above recording system so that recording can be carried out quickly after the rise time of the recording system elapses. Therefore, the problem of transfer time that is too long as compared with the rise up of the recording system does not arise. Consequently, it is possible not only to prevent the irregular dark current but also to maintain the level of the dark current itself at a minimum.

Other objects and features of the present invention will become obvious from the description to be made below with reference to the accompanying drawings.

BRIEF DESCRIPTION OF THE DRAWINGS

FIG. 1 shows a block diagram of the first embodiment of the image recording device of the present invention.

FIG. 2 shows an example of the image pick-up arrangement to be used in the device shown in FIG. 1.

FIG. 5(a) shows the interline type, while FIG. 5(b) shows the frame transfer type.

FIG. 6(a) shows the case of the image pick-up arrangement in FIG. 5(a) is used, while FIG. 6(b) shows the case the image pick-up arrangement in FIG. 5(b) is used.

FIG. 8(a) shows the interline type image pick-up arrangement, while FIG. 8(b) shows the frame transfer type one.

DESCRIPTION OF THE PREFERRED EMBODIMENTS

Figure 4:
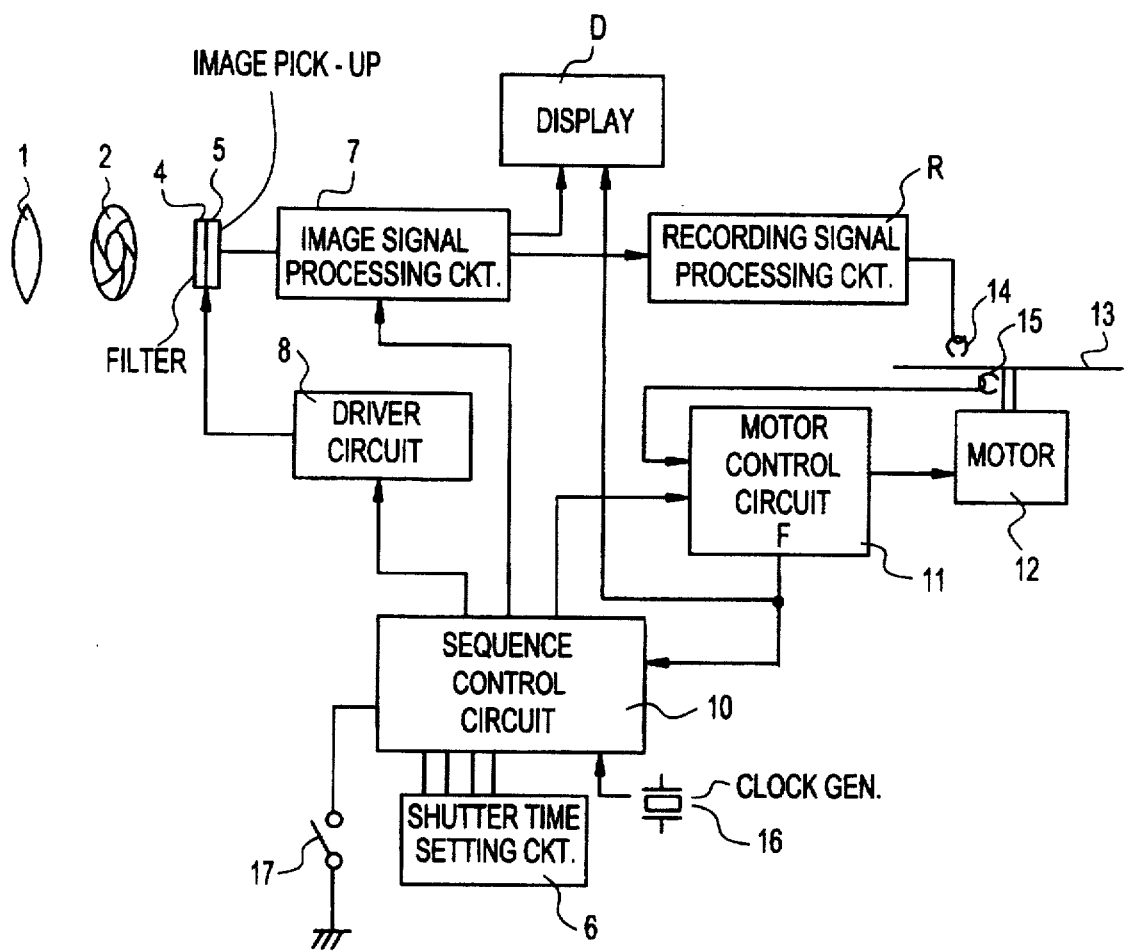
FIG. 4 shows a block diagram of the second embodiment of the image recording device of the present invention.

The present invention is explained in detail in accordance with the drawing of an embodiment. FIG. 1 shows a block diagram of the first embodiment of the image recording device of the invention.

FIG. 1 includes photographing optics 1, a diaphragm arrangement 2 which can be of physical property or mechanical and a shutter arrangement of the present invention. The shutter arrangement can also be of physical property or mechanical and may further be used in common with the diaphragm arrangement. Member 5 is a photoelectric converting type image pick-up arrangement, such as the CCD (Charge Coupled Device). A color filter 4 is arranged in front of the above image pick-up arrangement and can he of stripe type or mosaic type. This filter can be omitted when a monochrome image is to be obtained.

Circuit 6 is a shutter time setting circuit. An image signal processing circuit 7 converts the image signal from the image pick-up arrangement into a signal form suited to be recorded or displayed. A driver circuit 8 controls the scanning, the transfer and so on of the imge pick-up arrangement 5. A shutter control circuit 9 serves for controlling the operation of the shutter arrangement 3 in accordance with the value set by the above setting circuit. A sequence control circuit 10 controls the sequence of the whole image recording device of the present embodiment.

A motor control circuit 11 is to be controlled by the sequence control circuit along with the closing of the power source switch. Also included is a motor 12 to be synchronously controlled with the control circuit 11, a magnetic disc 13 to be driven by the motor, a magnetic head 14, and a PG (Pulse Generator) head 15 for feeding back the rotation phase of the motor to the motor control circuit 17. A terminal F produces the servo look finish signal, for example, a high level signal, when the control input in the control circuit 11 and the PG head output are locked in phase. Member 16 is a clock generator, and 17 is a recording switch which at the same time serves as the power source switch in the present embodiment, and D is a display or display device such as a monitor.

FIG. 2 shows an example of the construction of, for example, an interline type CCD serving as the image pick-up arrangement shown as 5 in FIG. 1.

FIG. 2 includes a light sensing portion 18, a vertical shift register 19 used as a memory portion, a horizontal register 20, and an amplifier 21. Signal $\phi 1$ is a shift pulse from each picture element to the vertical register, signal $\phi 2$ is a vertical transfer pulse and signal $\phi 3$ is a horizontal reading out pulse.

The image pick-up arrangement in the drawing can be of any type, namely the frame transfer type or the MOS type.

Figure 3:
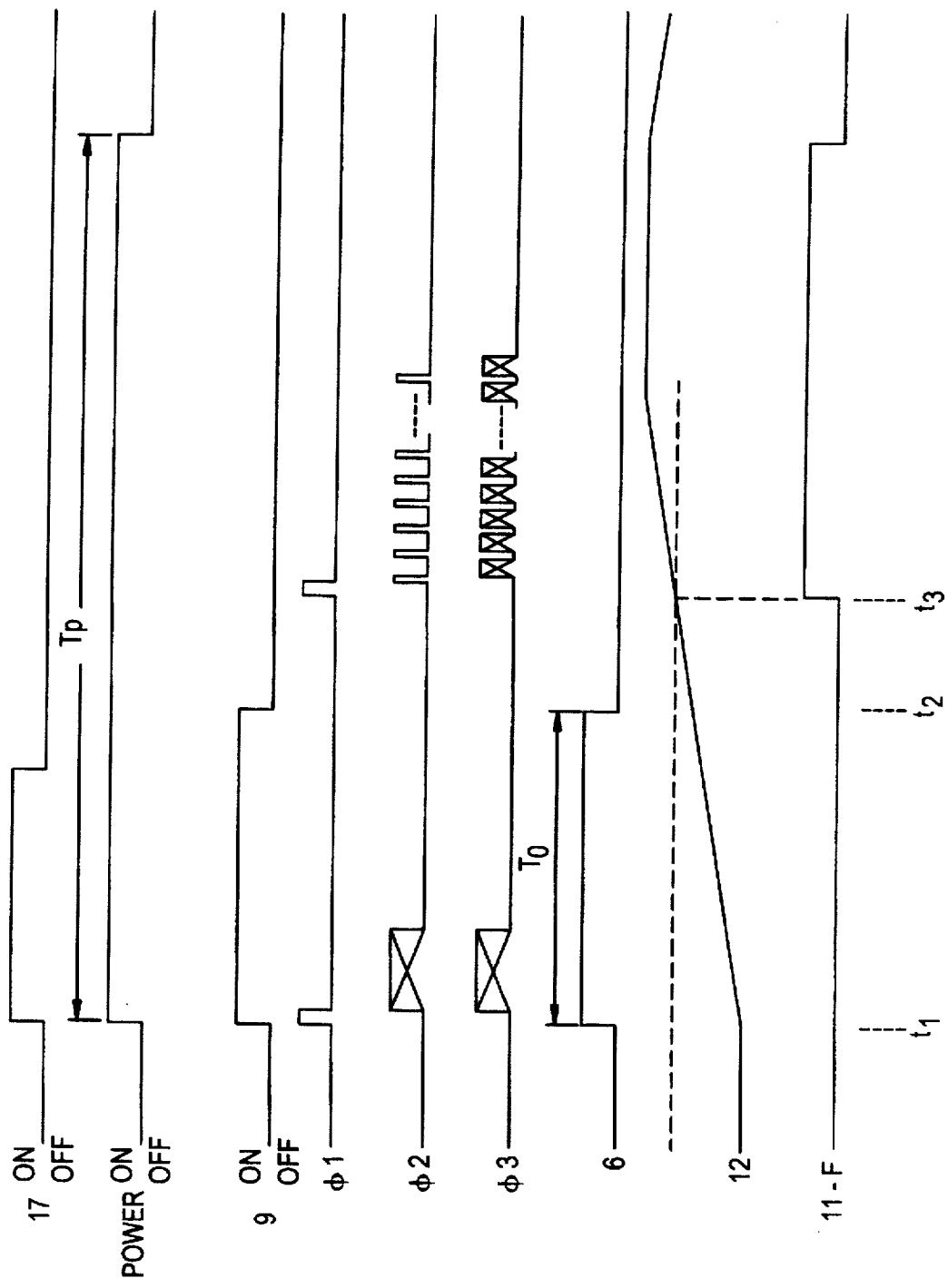
FIG. 3 shows a timing chart of the important parts of the device in FIG. 1.
Figure 4:
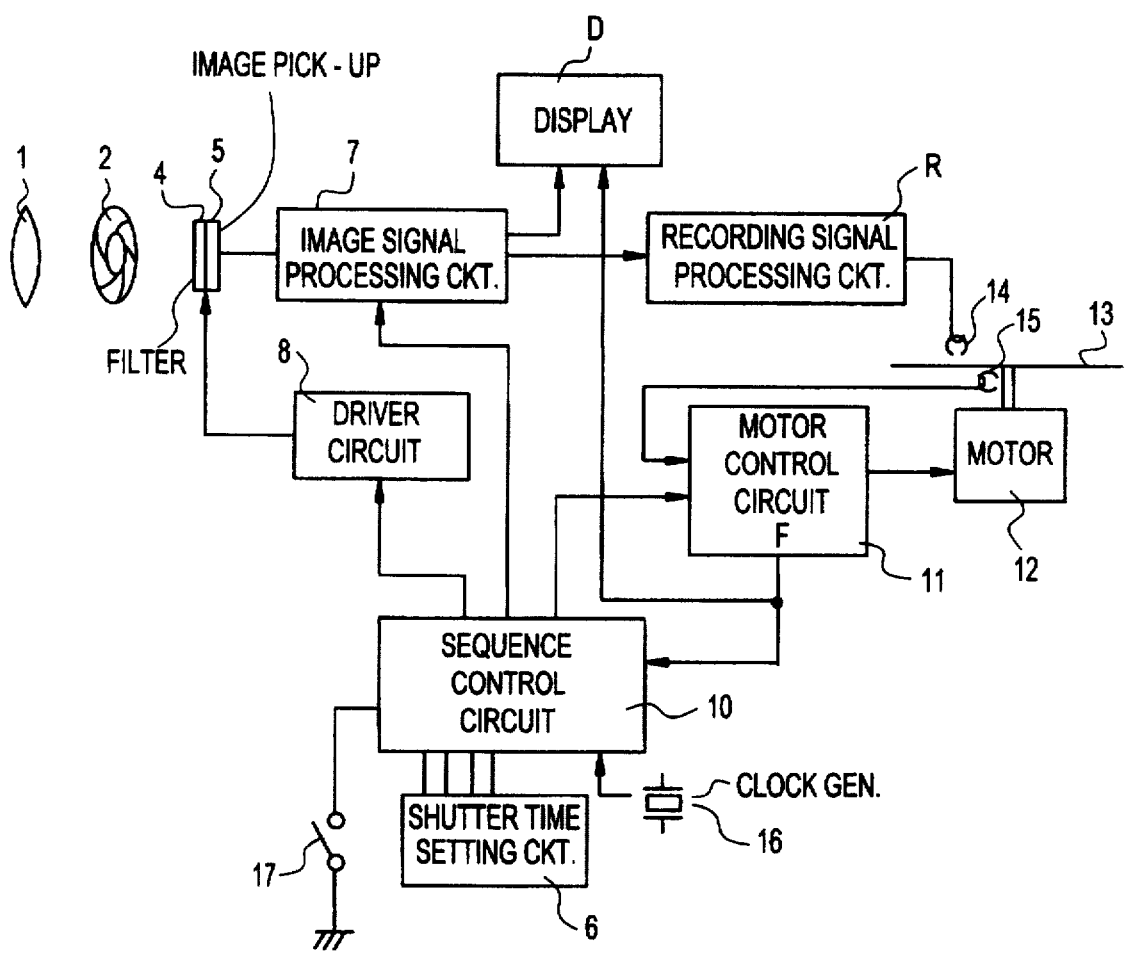

FIG. 3 shows the timing chart at the important parts of the block shown in FIG. 1.

The present invention is explained in detail in accordance with FIG. 3.

When the recording switch 17 is closed at the time t1, (the output goes low), power is supplied to every circuit via the not shown conductors.

The shutter is then opened by the shutter control circuit 9, while the driver circuit 8 produces the transfer pulses $\phi 1$, $\phi 2$, $\phi 3$ as shown in FIG. 3 in such a manner that any unnecessary charge such as the dark current is read out at high speed so as to be eliminated.

When the time T0 set bv the shutter time setting circuit 6 has elapsed at the time t2, the shutter finishes the exposure to the image pick-up element 5. Hence, immediately after the recording switch 17 is closed, the image information for one frame is formed in the light sensing portion 18 of the image pick-up arrangement 5.

While the image is being formed in the light sensing portion for use by the signal processing circuit 7, the output of the motor control circuit 11 and the rotational speed of the disc 13 increase until, at the time t3, the F terminal delivers the servo lock finish signal of the motor control circuit 11 as shown in FIG. 3. The driver circuit 8, in response to the sequence control circuit 10, then starts to read out the image information formed in the image pick-up arrangement as shown in FIG. 3. The F terminal delivers the output in synchronism with the synchronizing signal. If the F terminal does not, the read out can be made to occur in response to the first synchronizing signal after the F terminal delivers its output.

The output of the F terminal is displayed in the display D with a predetermined mark. In this way, the time the next image pick-up is possible can be recognized. The output of the F terminal can be acoustic.

During the time (Tp), namely the interval from closing of the switch 17 at least till the recording on the disc 13 is finished, the power supply is kept on by the sequence control circuit in case of the present embodiment. In the present embodiment, the read out is carried out with the servo lock finish signal. However, the read out can be made to occur in response to the vertical synchronizing signal after a timer delivers an output. The time is arranged to produce a signal upon elapse of a predetermined time after the shutter has operated. Also, it is sufficient to start the read out after detecting by some means that the recording system is stabilized. The reading out of the image pick-up element can be made with a manual switch. Also, the read out may be started with a counter instead of the above timer by counting the vertical synchronizing signal until it has reached a predetermined count value.

As thus far explained, in accordance with the present invention, the recording switch or the image pick-up switch 17 simultaneously serves as the power source switch, so that energy can be efficiently economized. Also, the shutter is arranged so that closing of the power source switch allows at least a one-frame picture to be recorded, and so that it is possible for the photographer to take the picture at any desired instant.

Further, the unnecessary charge such as the dark current is eliminated before photography. This improves the S/N ratio and hence the efficiency of the process.

FIG. 4 shows a second embodiment of the present invention. Here, in order to make it possible to pick up an image before the rise of the recording system without using the shutter, at least part of the CCD type image pickup element is used as a memory.

In FIG. 4, elements having the same reference characters as those in FIG. 1 are the same. Here, an image signal processing circuit 7 in FIG. 4 converts the image information obtained from the image pick-up means into a proper signal form such as an NTSC signal. A recording signal processing circuit R converts the output of the image signal processing circuit 7 into a signal suitable for recording on the disc 13 by the magnetic head 14.

Figure 5A:
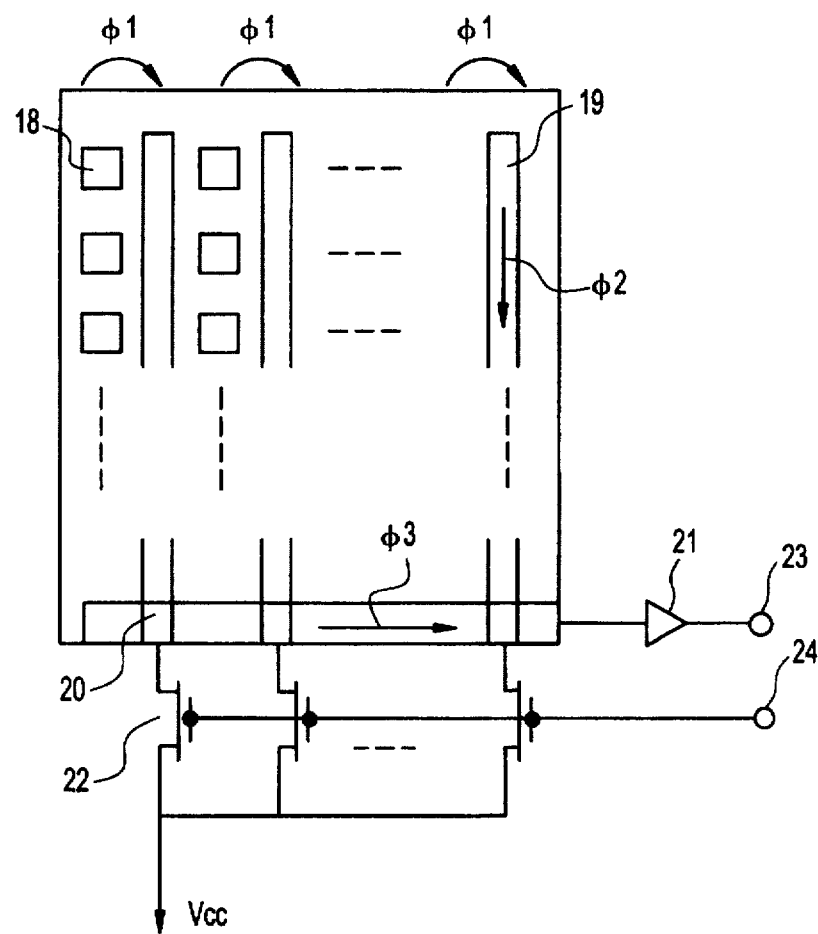
FIGS. 5(a) and 5(b) show the image pick-up arrangement to be used in the present embodiment, whereby
Figure 5B:
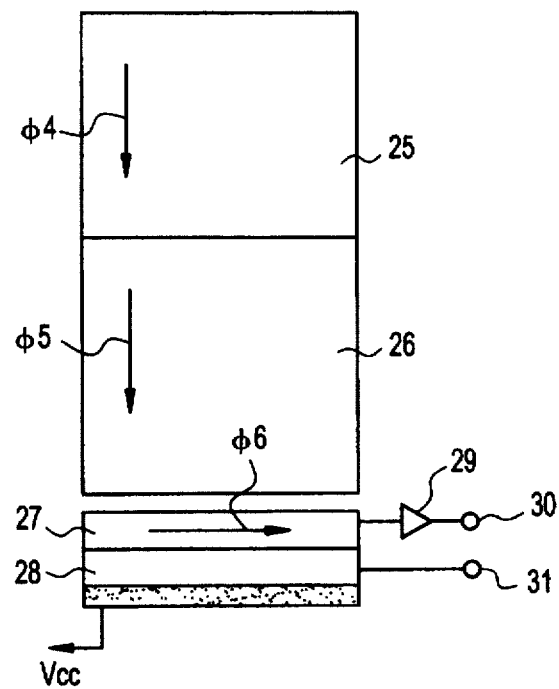

FIGS. 5(a) and 5(b) show an example of the image pickup arrangement designated as 5 in FIG. 4. FIG. 5(a) shows the interline transfer type, while FIG. 5(b) shows the frame transfer type. Members having the same reference characters as those in FIG. 2 are the same members. Field effect transistors 22 serve as gates with the power source connected to their drains. Member 23 is an output terminal and member 24 a gate control input.

If, for example, one supplies a high level signal to the gate control input terminal 24, the charge in the horizontal shift register is exhausted to the drain.

FIG. 5(b) includes a light sensing portion 25, a storage portion 26 serving as a memory, a horizontal shift register 27, a gate arrangement 28 shown with transistors 22 in FIG. 5(a), an output amplifier 29, its output terminal 30, and a gate control input terminal 31.

One end of the gate 28 is connected to the power source. A pulse $\phi 4$ is the vertical transfer pulse in the light sensing portion, pulse $\phi 5$ is the vertical transfer pulse in the memory portion, and pulse $\phi 6$ is the horizontal reading out pulse.

Figure 6A:
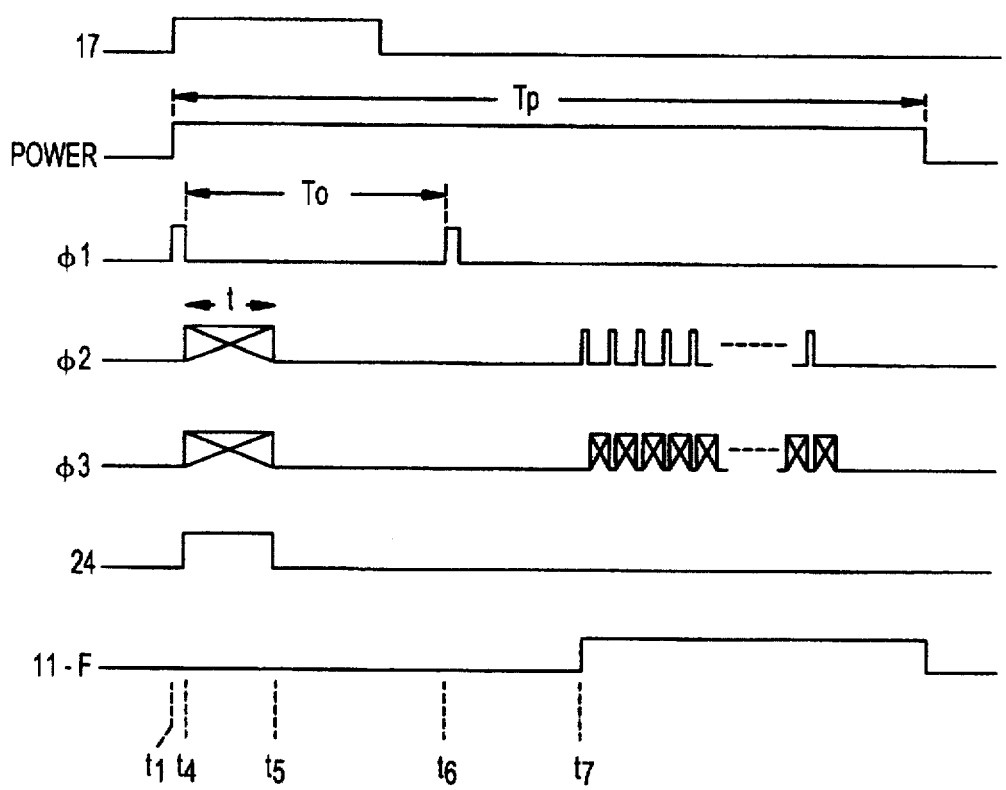
FIGS. 6(a) and 6(b) show timing charts of the important parts of the devices shown in FIG. 4, whereby
Figure 6B:
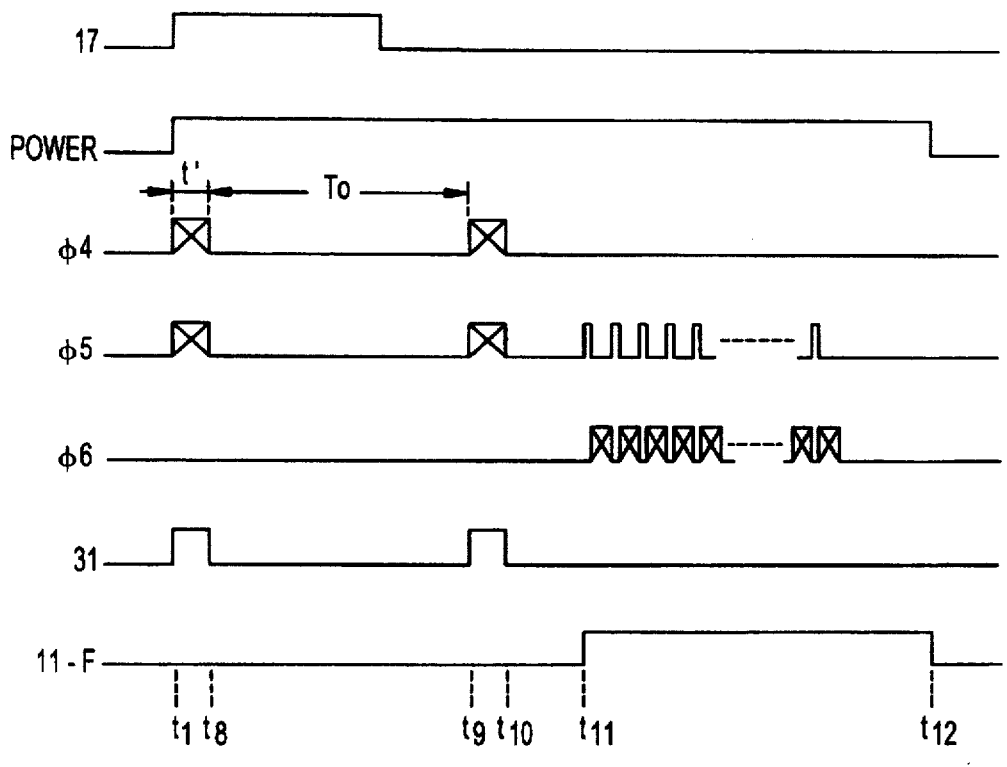

FIGS. 6(a) and 6(b) illustrate a timing chart of the important parts of the block diagrams in FIG. 4. FIG. 6(a) shows the timing when the element in FIG. 5(a) is used, while FIG. 6(b) graphs the variations when the element in FIG. 5(b) is used.

When the recording switch 17 is first closed in FIG. 6(a), power is supplied to each circuit via conductors not shown. As shown in FIG. 6(a), the pulse $\phi 1$ is supplied to the image pick-up element by the driver 8, while the charge formed in the light sensing portion is transferred from the vertical shift register and to the horizontal shift register 20 by the pulse $\phi 2$. During this time (t) the level of the control input 24 of the gates 22 becomes high so that the charge transferred to the vertical shift register to the horizontal register flows to the power source. The time t necessary to clear this charge is negligible. It is, for example, 0.3 msec if the transfer clock is 2 MHz and the vertical register is 600 bits. A charge clear gate near the light sensing portion can further shorten this time. When the time T0 predetermined by the storage time setting circuit 6 has passed at the time t6, the charge formed in the light sensing portion 18 is transferred to the vertical register 19 by the pulse $\phi 1$.

Thus, immediately after the closing of the recording switch 17, data for a one-frame picture is formed in the register 19 of the image pick-up arrangement 5.

During the above storage operation, the signal processing circuits 7 and R, the motor control circuit 11, the motor 12 and the rotation of the disc 13 reach their operating characteristics. At the time t7, then the servo lock finish pulse from the motor control circuit 11 is obtained from the F terminal, the picture information formed in the image pick-up arrangement 5 is read out by the pulses $\phi 2$ and $\phi 3$ from the driver circuit 8 and the sequence control circuit 10 as shown in FIG. 6(a) and led to the head via the circuits 7 and R.

Further, although in the present embodiment, the image information is formed once in the memory portion of the element, the information can be stored in an external small capacity memory for a short time. However, this makes the construction complicated.

The operation of the image pick-up element of the type shown in FIG. 5(b) is explained by reference to FIG. 6(b).

At the time t1 when the recording switch 17 is first operated, the power is supplied to each circuit via the conductors not shown. Now, the pulse $\phi 4$ shown in FIG. 6(b) is delivered to the image pick-up element and the unnecessary charge already formed in the light sensing arrangement 25 is transferred to the memory portion 26, while the charge in the storing portion 26 is transferred to the horizontal register.

During this time (t'), a high level signal is applied to the gate control input terminal 31 so that the charge in the storage portion is cleared. Here, the time needed for clearing a charge such as from the light sensing arrangement is negligible, namely 0.3 msec, assuming that the frequency of the transfer lock is 2 MHz and the number of the vertical picture elements in the light sensing part is 600.

When a predetermined time T0 set by the time setting circuit 6 has passed, after the time t8, and reaches the time t9, the charge formed in the light sensing arrangement 25 is quickly transferred to the storage portion 26, while the charge remaining in the storage portion 26 is drained via the gate 28.

The transfer time in this case also can be made as small as 0.3 msec. so that there is little problem of smear.

When the servo lock finish signal is obtained from the F terminal of the motor control circuit 11, the signal read out by the pulses φ5 and φ6 shown in FIG. 6(b) is led to the head via the signal processing circuits 7 and R. Here, contrary to the first embodiment, the shutter is unnecessary. This is a significant advantage.

Although the recording switch and the power source switch are shown as the same, they can be separated. They are then arranged such that the first step of a two step switch operates the image pick-up element 5, the driver circuit 8, the control circuit 10, the picture signal processing circuit 7 and the display device D, while with the second step supplies power supplied to other circuits, so that during the first step, monitoring is possible with the display device. Further, it is possible to stabilize the image pick-up system before the recording switch is closed.

Both of the image pick-up elements of the present embodiment have a special gate and a drain to perform a clearing function. This serves to speed up the clearing of the elements before image pick-up. It goes without saying that the clearing operation can be performed by successively reading out the charges in the light sensing portion, at high speed, from the horizontal shift register in the same way as for ordinary read out.

Figure 7:
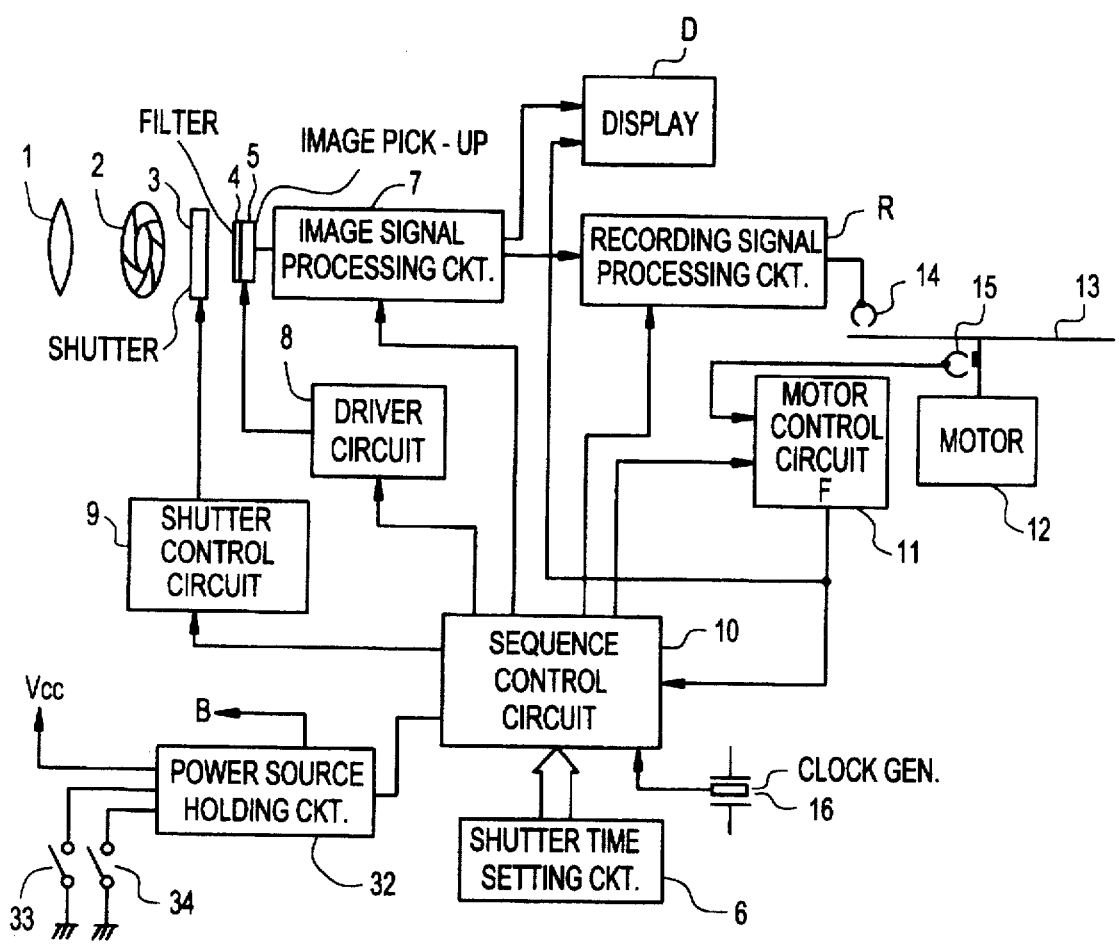
FIG. 7 shows a block diagram of the third embodiment of the image recording device of the present invention.

FIG. 7 shows another embodiment of the present invention. This embodiment is arranged to memorize data for two picture frames during the time after the recording switch or the photographing switch is closed till the recording system powers up. Members having the same reference characters as those in FIGS. 1–6 are the same members.

Member 32 is a power source holding circuit, 33 a switch to be closed with the first step of a two step switch so as to supply current to circuits other than the recording circuit, 34 is a switch to be closed at the second step so as to supply current to the recording system. Vcc a power source, and B a conductor to each circuit.

In the present embodiment, it is possible to set the storage time (T1 respectively T2) for two-frames of picture data with the setting circuit 6 as will be explained.

Figure 8A:
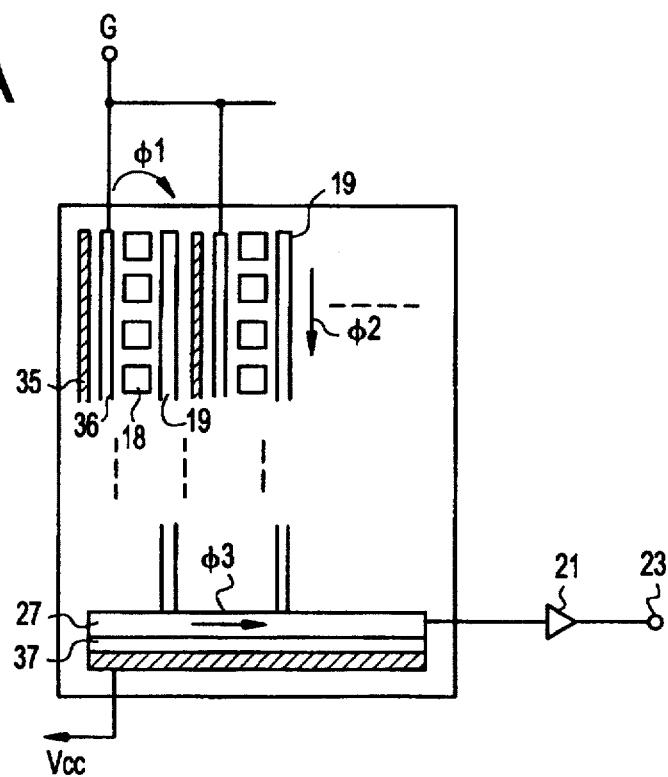
FIGS. 8(a) and 8(b) show the image pick-up arrangement to be used for the present invention, whereby
Figure 8B:
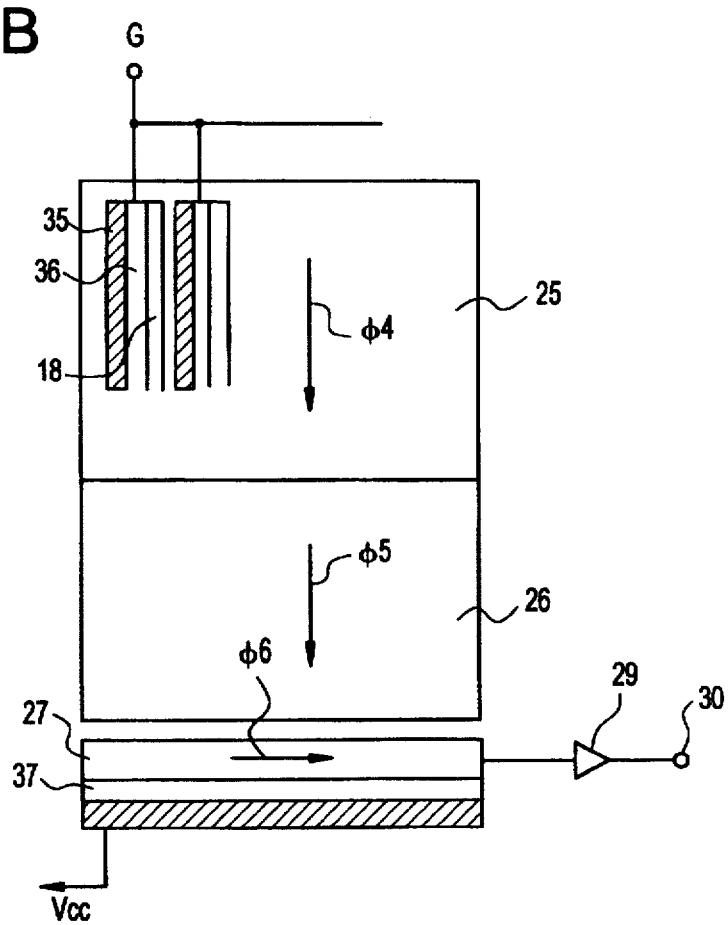

FIGS. 8(a) and 8(b) show examples of the image pick-up device 5 to be used in the embodiment in FIG. 7. FIG. 8(a) shows the interline type, while FIG. 8(b) shows the frame transfer type CCD. In these examples, the charge clearing drain is provided to reach each picture element of the light sensing portion.

The members in FIG. 8 having the same reference characters as those in FIGS. 5(a) and 5(b) are the same members. Member 35 is an anti-blooming drain, 36 a gate for causing the charge in the light sensing portion 18 to discharge into the drain 35, G a terminal for controlling the gate 36 and 37 the anti-blooming barrier for causing surplus charge in the horizontal register to discharge into the drain.

Figure 9:
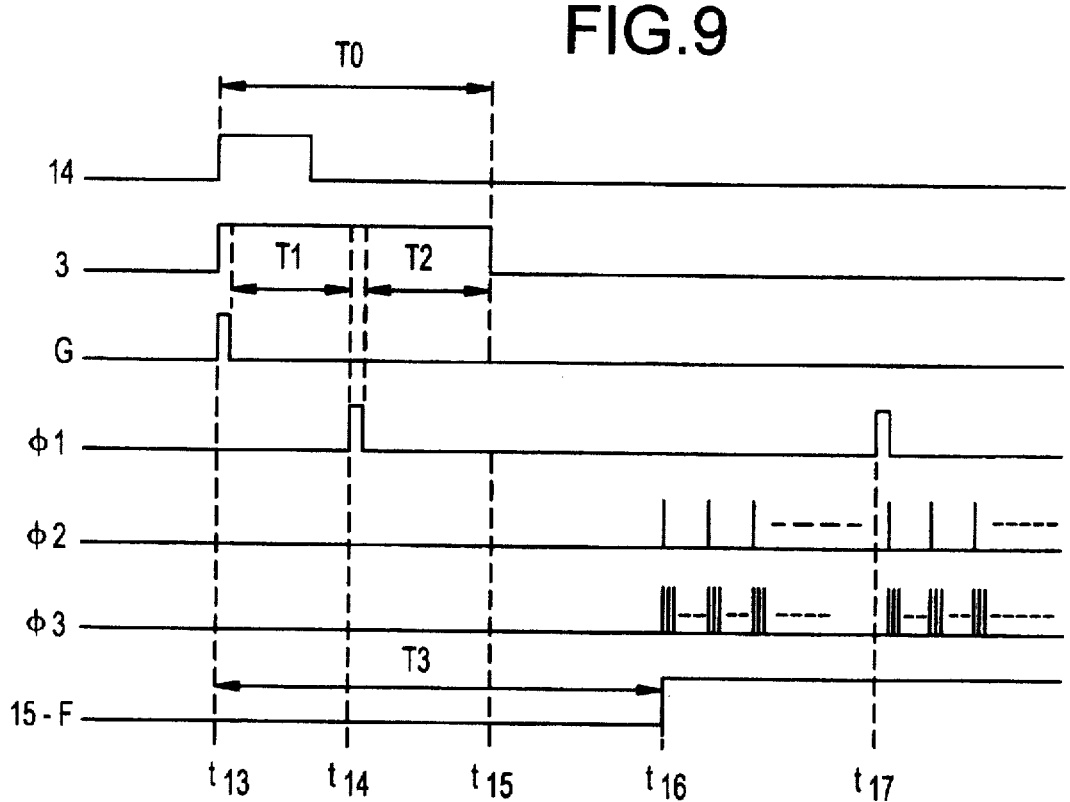
FIG. 9 shows a timing chart of the important part of the fourth embodiment consisting of the device in FIG. 7.
Figure 10:
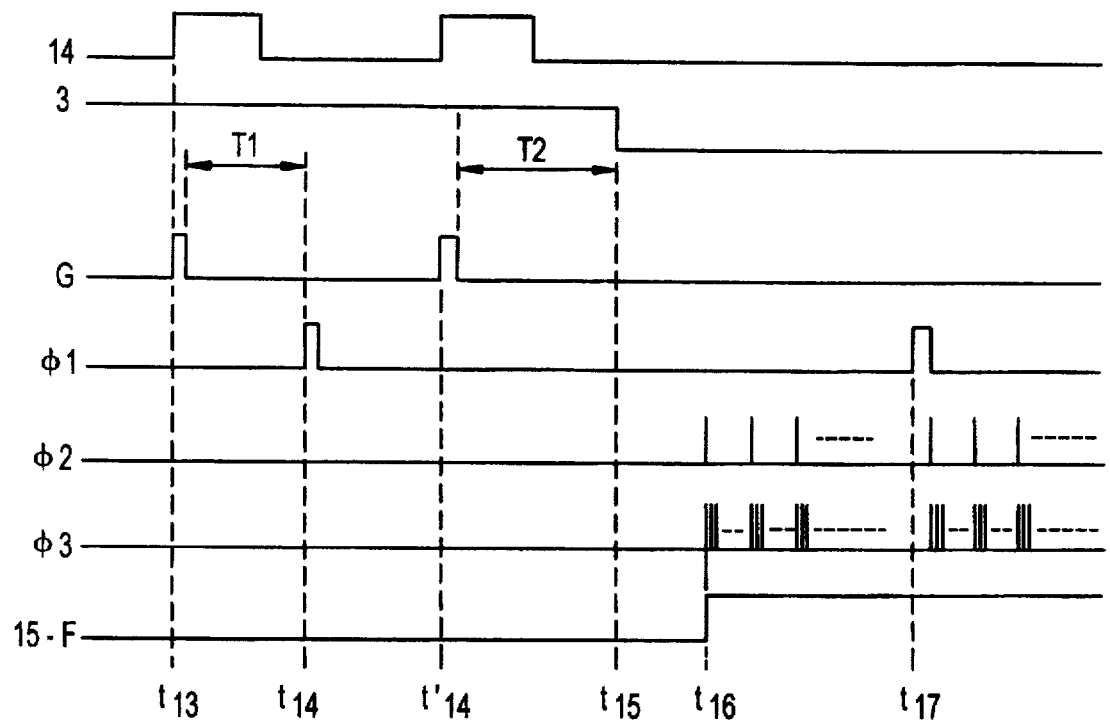
FIG. 10 shows a timing chart of the important part of the fifth embodiment.
Figure 11:
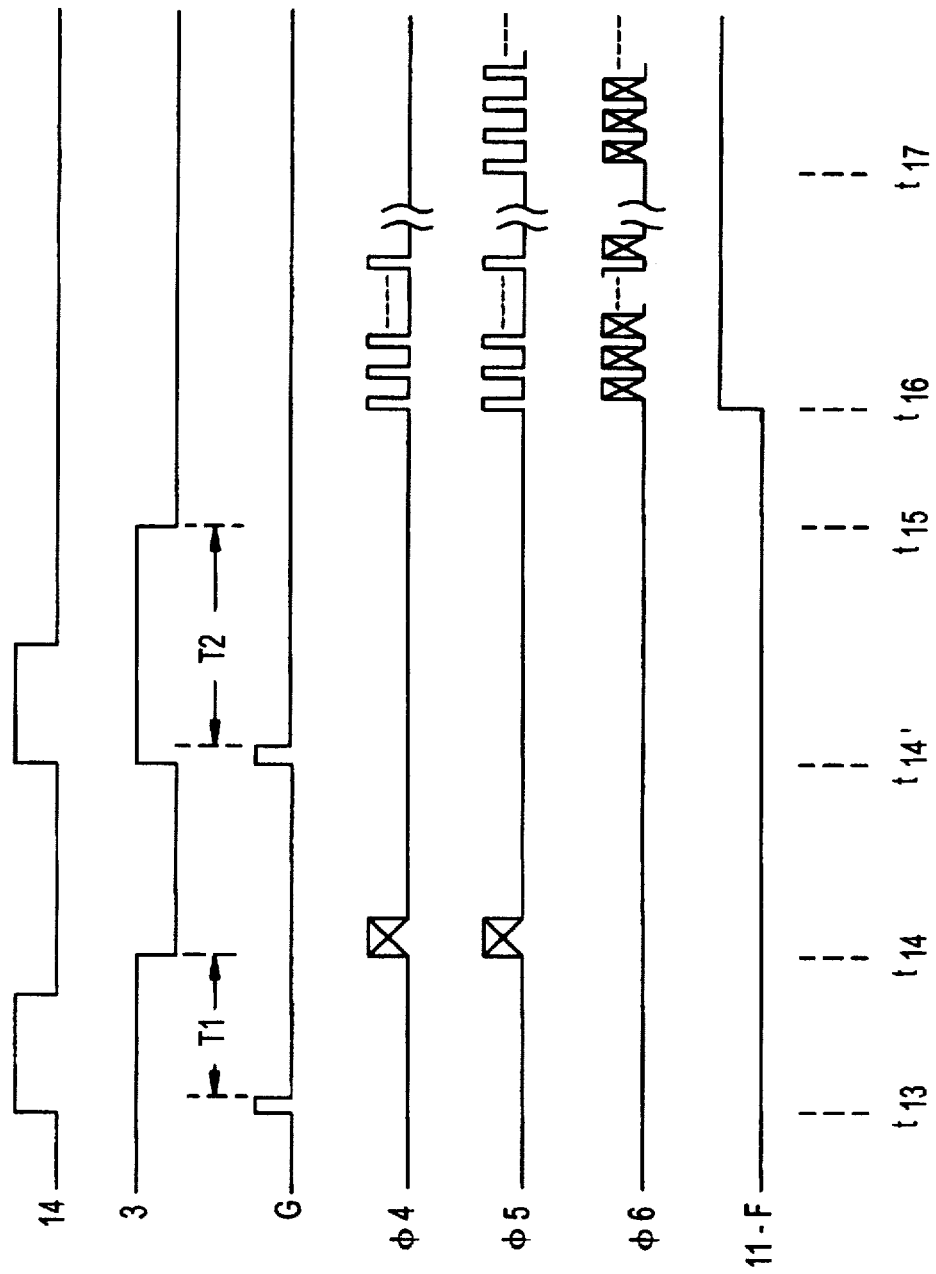
FIG. 11 shows a timing chart of the important part of the sixth embodiment.

FIGS. 9–11 show the timing charts of the important parts of the embodiments shown in fourth to sixth embodiments in order to explain the present invention. Below, the operation of the embodiments are explained in accordance with FIGS. 9–11.

In the fourth embodiment shown in FIG. 9, by once the recording switch 34 is operated the power source holding circuit 32 starts to apply the voltage of the power source Vcc to each circuit of the recording system for a perdetermined time after the switch 34 closes. Here, the recording system is composed for example, of the motor control circuit 11, the motor 12, the recording signal processing circuit R and so on.

With the operation of the switch 34 the shutter 3 is opened during the time T0 (T1+T2) set by the setting circuit 6. With the supply of the pulse to the gate of the device in FIG. 8(a) the dark current and so on already formed in the light sensing part 18 flows into the over flow drain 35. When the storing time t1 set by the setting circuit 6 elapses, a pulse φ1 transfers the charge in the light sensing portion 18 to the vertical shift register 19, and one-frame picture information obtained during the time T1 is held in the shielded vertical shift register for a short time.

Then the picture information for a second frame formed in the light sensing portion 18 during the time T2 after the time point (t14) at which the above shift pulse φ1 is supplied till the time point at which the above shutter is closed is maintained in the light sensing portion 18 while the shutter is closed.

At the time t16 upon elapse of the time T3 after the recording switch 34 has been operated the signal obtained from the PG head 15 for detecting the motor rotation phase and the signal corresponding to the synchronizing signal in the motor control circuit 11 are locked in phase. Thereafter, the level of the output of the terminal F goes high. With the rise of the lock signal the recording head 14 automatically reads out the first-frame picture information in the vertical shift register so it is memorized in the disc 13. At the time t17 the second-frame picture information is shifted from the light sensing portion 18 to the vertical shift register in synchronism with the synchronizing signal in the sequence control circuit 10 and then the following picture data are successively read out and memorized.

Further, the switch 33, which is operated at the first position of the stroke, supplies current to circuits other than the above recording system in order to operate the light measuring circuit [not shown] or the automatic iris circuit [not shown] and so on. It is also possible to start the current supply to the motor, which powers up last, by the operation of the switch 33. Although in this case the power consumption is increased somewhat, the problem of rise time is solved remarkably well. In the present embodiment it is possible to control the system to open the shutter 3 before the operation of the switch 34, and it is possible to monitor with the display device D by reading out the pictures periodically (for example every 1/60 sec) with the operation of the first position switch 33.

Although in the present embodiment the time T1 for forming the first-frame picture and the time T2 for forming the second-frame picture are made equal to each other, it is possible to set them separately with the setting circuit 20.

FIG. 10 shows the timing chart of a fifth embodiment of the present invention. This embodiment is explained with respect to the image pick-up device in FIG. 8(a). Along with the operation of the first step switch 33 the shutter is opened and the power is supplied to each circuit of the image pick-up system, the display device D, the sequence control circuit 10 and so on.

Further, the image pick-up element is able to monitor the image in the display device D which scans every 1/60 sec. until the switch 34 is operated.

Then at the time t13 when the switch 34 is operated once, a pulse is delivered to the terminal G of the device in FIG. 8(a) via the driver circuit so as to clear unnecessary charge, while the power starts being supplied to the motor. After the time T1 set by the setting circuit 6 passes and a pulse φ1 is supplied and the picture information is transferred to the vertical register.

As in the fourth embodiment when the motor starts in this state, the level of the output F of the motor control circuit 11 goes high. Hence in synchronism with the synchronizing signal from the sequence control circuit a read out of the vertical shift register is carried out and a one-frame picture can be recorded. Further, when the switch 34 is operated to pick up the first picture and again operated to pick up the second picture, the charge in the light sensing portion 18 is again cleared. Then after a lapse of the time T2 the shutter is closed so that the second-frame picture information is held in the light sensing portion 18. Also, when the level of the output F goes high, the first frame is read out only by pulse φ2, φ3 and the second-frame picture is read by pulses φ1–φ3 to be recorded on the disc. In the present embodiment the images of the first and second frame can be photographed at any time and the shutter operation is simple enough to allow simplification of the construction of the shutter. Both of these are desirable ends.

FIG. 11 shows the timing chart of a sixth embodiment which is shown by the image pick-up device in FIG. 8(b). When at first the first step switch 33 is operated, as in the case of the fifth embodiment, the shutter is opened, while the image pick-up system starts so as to enable the monitoring of the picture.

At the time t13 when the second stroke switch 34 is operated once, a pulse is delivered to the terminal G of the image pick-up device in FIG. 8(b), the charge in the light sensing part is cleared and current starts flowing to the motor. When then the time T1 has passed the shutter 3 is closed and the first-frame picture information is transferred from the light sensing zone 25 to the storing zone 26 by the pulses φ4, φ5 so as to be held there. When the switch 34 is then operated again the shutter 3 is again opened, while a pulse is delivered to the gate G so as to clear unnecessary charge. When then the time T2 has passed the shutter is closed and the second-frame picture information is held in the light sensing portion 26.

When the servo lock finish signal is obtained at the time t16 the pulses φ4–φ6 are supplied as shown in the drawing and the first-frame information memorized in for the storage portion 26 is read out and recorded, while the second-frame picture information is read out and recorded bar the pulses φ5, φ6.

In the present embodiment the possibility of smear is small as compared with the fourth and fifth embodiment. If strong light strikes when the first-frame picture information is transferred to the storing portion 26 such as the register in case of the fourth and the fifth embodiment, smear may take place with the frame transfer type image pick-up device. In the present embodiment the light does not strike while the charge is transferred vertically. This eliminates the above shortcomings completely.

The aforementioned embodiments are constructed so that operating the switch in order to power up the recording system causes a one-frame picture information to be obtained, held once in the register or the storing portion in the image pick-up element and then causes the second-frame picture information to be held in the light sensing part so that the information for the two frames can be obtained before the recording system powers up.

Consequently, it is possible to drive the recording system with every photograph so that significant power can be economized, while it is also possible to take pictures without waiting for the power up of the recording system. Thus an opportunity for a photograph need not be lost. Further, in accordance with the present invention two frames of pictures can be taken before the power up. Hence there is practically no problem of power up of the recording system so that a larger inertia can be used in order to stabilize the rotation of the recording system. This is effective for preventing the jitter.

Figure 12:
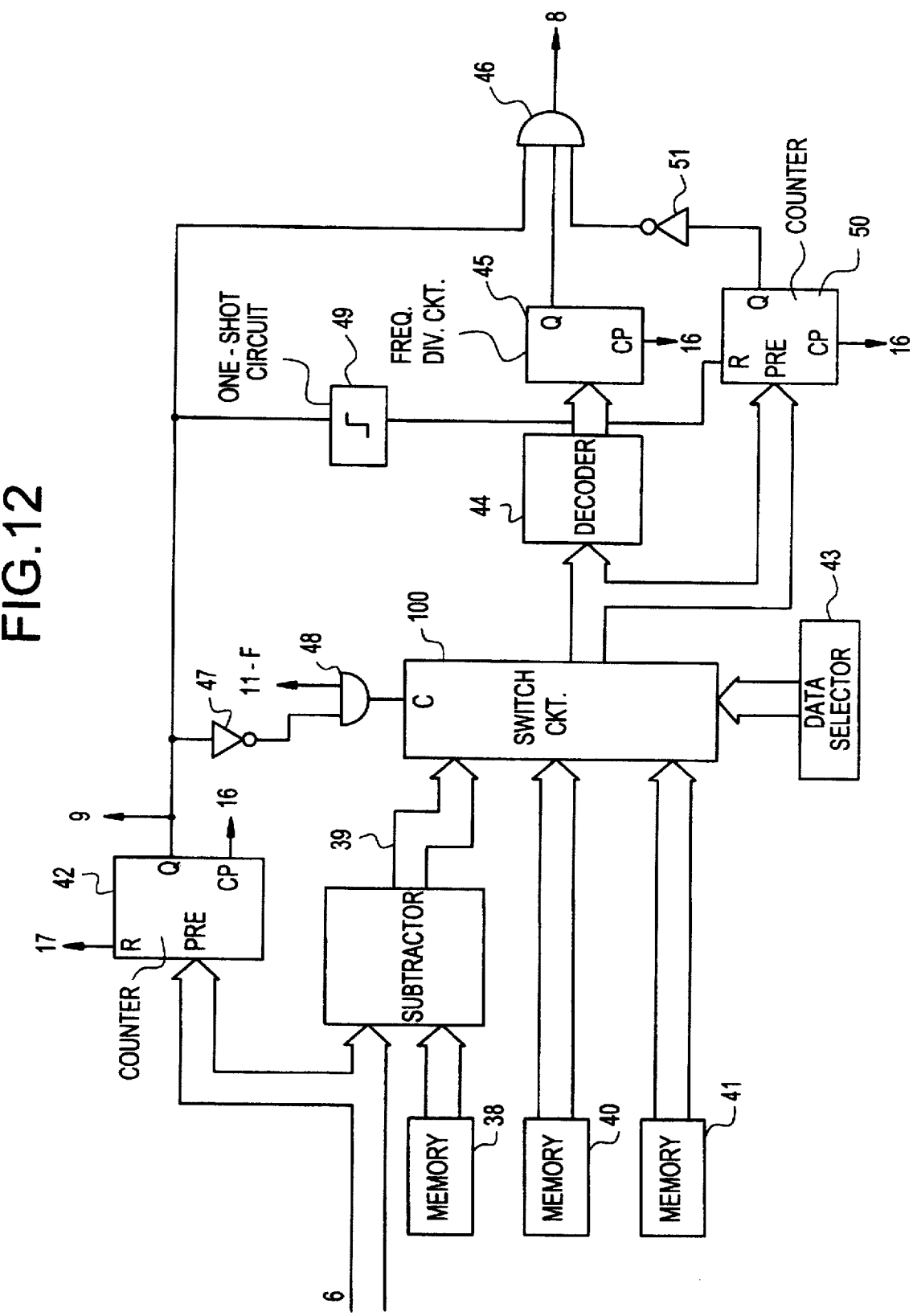
FIG. 12 shows a block diagram of the seventh embodiment of the present invention.
Figure 13A:
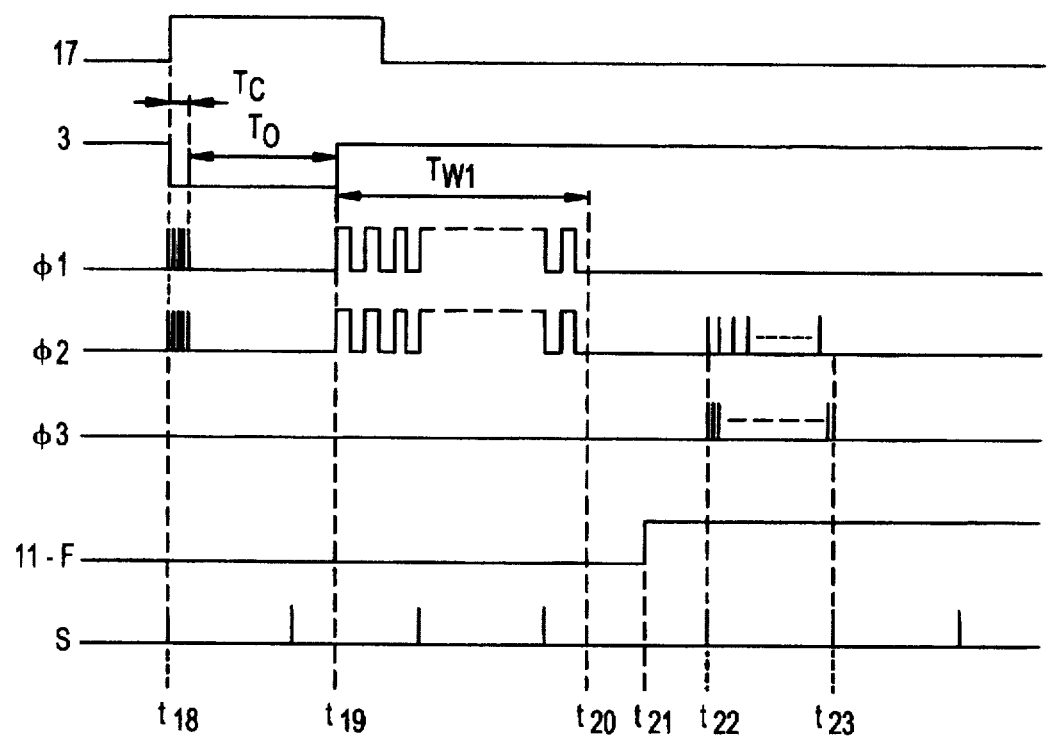
FIGS. 13(a) and 13(b) show timing charts of the seventh embodiment.

FIG. 12 and FIGS. 13(a), (b) show a seventh embodiment of the present invention. The present invention is constructed so that in the same way as in the second embodiment in FIG. 6(a) a one-frame picture is memorized in the memory portion of the image pick-up element before the power up of the recording system. Hence irregular dark current is prevented by choosing as low a frequency as possible for transferring the charge from the light sensing portion to the storing portion.

Generally, in a CCD type element dark current is formed gradually in each bit during the non-transfer time. Thus the amount of the produced dark current is different for each bit.

Consequently, the transfer should be carried out normally in order to eliminate the irregularity of dark current.

Thus, in accordance with this embodiment the light sensing portion and the storing portion are driven during the waiting time for the power up of the recording system.

For this purpose transfer pulses with a frequency corresponding to the above waiting time are supplied to the image pick-up element.

In accordance with the driving method in FIG. 6(b) the transfer time which was originally sufficient to cover the time from the time t9 to t10 is prolonged to cover the time t9–t11.

FIG. 12 shows an embodiment of the construction for the above purpose. Here a part of the sequence control circuit in FIG. 4 is illustrated. Members having the same structure as those in FIG. 4 carry the same reference characters.

A memory 38 produces fixed data, and the time necessary for the recording system to power up is memorized in the memory. A subtractor 39 obtains the difference between the time set in the image storing time setting circuit 6 and that set in the memory 38. A presettable counter 42 counts the time corresponding to the output of the above storing time setting circuit 6 and receives the output of the circuit 6 at its preset input terminal. A reset terminal R receives a reset input in response to the operation of the memory switch 17, so the counter 42 delivers a high level signal from the terminal Q when the clock 16 has counted to the value set in the setting circuit 6 after the operation of the memory switch 17. This high level signal is applied to the shutter control circuit 9 so as to close the shutter 3. The shutter is controlled to be closed when the level of the output of the terminal Q is low.

The output data of the subtractor 39 corresponds to the waiting time for the power up of the recording system after the finish of the image storage in the image pick-up element and is ordered to the decoder 44 via the switch circuit 100. The output of the decoder is connected to control the frequency dividing ratio of the frequency dividing circuit 45.

The larger the decoder input the larger is the frequency dividing ratio. The output Q of the frequency dividing circuit 45 is supplied to the driver circuit 8 of the image pick-up element via the three input AND gate 46.

Further, the output of the switch circuit 100 appears at the preset input terminal of the presettable counter 50, to whose reset terminal R the output Q of the above counter 42 is connected via the one shot circuit 49. Further, the output Q of the counter 50 is connected to the input of the AND gate 46 via the inverter 51. The counter 50 is constructed so that the level of the output Q goes high when it, after having been reset, has counted up to the preset value. The other output terminal of the AND gate 46 receives output Q of the counter 42.

Consequently, the output of the frequency dividing circuit 45 is delivered to the driver circuit 8 until a predetermined time has passed after the shutter is closed, so the output Q of the above counter 42 is used for forming a high level transfer pulse φ1 in the image pick-up element.

Further, memories 40 and 41 set fixed time data. Memory 40 produces time data almost corresponding to the vertical blanking term of for example a TV signal, while memory 41 produces proper time signals longer than the above. It is possible to set proper data in the memory by an external operation member.

A data selector 43 selectively leads one of the outputs going into the switch current 100, namely the output of the subtractor 39, the output of the memory 40 or the output of the memory 41, to the decoder 44. The control input C of the switch current 100 receives the servo lock signal at the output terminal F of the motor control circuit 11 and AND gate 47 whose other input receives the inverted output Q of the above counter 42. When the rotation phase of the motor is locked by the motor control circuit, a high level signal from the terminal F is delivered to the input of the switch circuit while the level of the output Q of the counter 42 is low, namely the shutter is open, when despite the selection of the above data selector 43 the data of the circuit 40 is compulsorily selected.

Thus, if the recording system has powered up before the shutter is opened, namely the transfer is started, the transfer frequency is set almost to the period of the vertical blanking.

Thus, during the power up period immediately after the operation of the recording switch 17 the transfer time is controlled in accordance with the time before the start up, while after the start up the read out is carried out for example during the fixed vertical blanking period.

When the recording system has started up the picture can be monitored easily.

It is possible that the transfer time selected when the recording system has powered up is another fixed value.

In the present embodiment the frequency dividing ratio of the transfer clock is varied in accordance with the waiting time for the speed up of the recording system, while it is possible to continuously control the transfer clock frequency by the VCO (Voltage Control Oscillator) after the waiting time is converted into the voltage level, in order to form the transfer clock from the output of the VCO.

Below, the present embodiment will be explained in detail in accordance with FIGS. 13(a) and 13(b). The image pick-up element in FIG. 5(b) is used in the present embodiment.

When the recording switch 17 is closed at the time t18 in FIG. 13(a) (output: H), the power is supplied to each circuit via conductors [not shown]. The counter 42 in FIG. 12 is reset. The shutter 3 is now opened by the shutter control circuit 9, while the driver circuit 8 delivers the high speed pulses φ1 and φ2 as shown in FIG. 13(a) such that the unnecessary charge passes the barrier 28 into the drain so as to be eliminated.

When then the time (Tc+To) preset by the storing time setting circuit 6 has passed, the level of the output Q of the counter in FIG. 12 goes high so as to close the shutter 3 via the shutter control circuit 9. In case no servo lock finish signal is obtained from the terminal F of the motor control circuit 11 and the selector 43 does not select the data of the memories 40 and 41 while the shutter 3 is closed, the time data (t20–t19) which is the difference between the time data (t20–t18) prefixed in the memory 38 and that (t19–t18) preset in the setting circuit 6 is delivered to the decoder 44 via the switch circuit 100 such that the frequency dividing circuit 45 produces a signal with a frequency corresponding to the time (t20–t19). This signal passes the AND gate 46 so as to be delivered to the driver circuit 8 after the shutter 3 is closed (time: t19) till the time (t20–t19) passes by the counter 50 in order to form the transfer pulse φ1.

At the time t21 a high level signal is obtained from the terminal F of the motor control circuit 11, and it becomes possible to read out the data already transferred to the storing portion of the image pick-up element. Here, in order to make it possible to start the read out after the transfer from the light sensing portion to the storing portion has been finished, the logic product of the output Q of the counter 50, the synchronization signal (FIG. 13(a)) from the sequence control circuit and the output at terminal ]F is obtained to start the read out of the picture information by the driver circuit 8, [not shown].

Figure 13B:
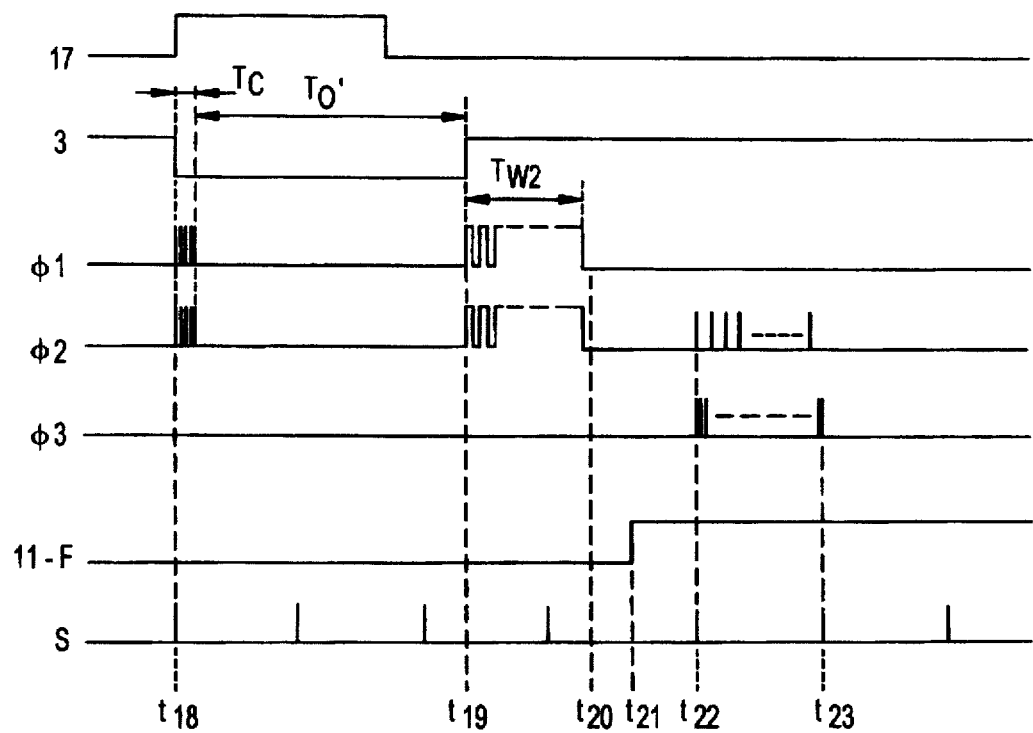

FIG. 13(b) shows the timing chart when the storing time changes from T0 to T0'. As is clear from the drawing, when the time (value set by the setting circuit 6) after the operation of the switch 17 till the closure of the shutter 3 is prolonged, the waiting time is shortened from Tw1 to Tw2 so that the transfer frequency becomes high.

As mentioned above in the present embodiment it is possible to set the time of the transfer frequency longer than at least the vertical blanking term so that the irregular dark current is evened out during the transfer, while the time therefore can be optionally adjusted so that the irregular dark current can be minimized during the given time.

Further, the transfer time or the transfer frequency is varied in accordance with the waiting time for the start up of the recording system and the dark current level is, not increased beyond necessity, so a suitable transfer time for checking the irregular dark current is set automatically. It is possible to obtain both the evening effect of the irregular dark current and the quick recording after the power of the recording system.

In accordance with the present embodiment the transfer time is returned to a predetermined value after the power up of the recording system. Hence for example if the second picture is taken immediately after the first picture a quick recording can be obtained.

According to a feature of the present embodiment, such a transfer time is optionally varied without the danger of the smear by shielding the light sensing surface during the transfer.

In the first to the seventh embodiments the image pick-up operation is started at the same time as the operation of the recording switch. This makes it possible to start the image pick-up operation in synchronism with the synchronizing signal after the signal is obtained.

Figure 14:
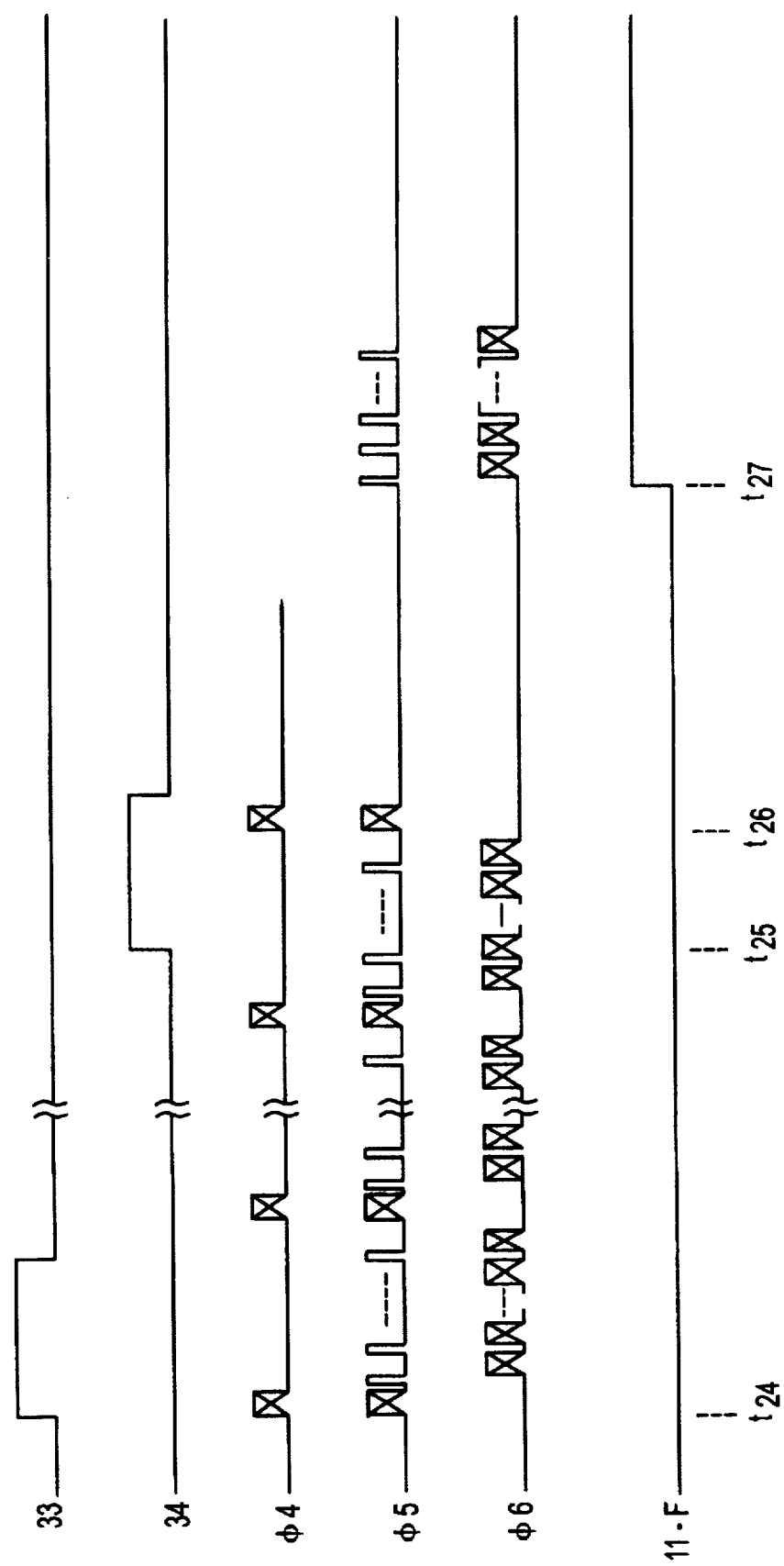
FIG. 14 shows a timing chart of the eighth embodiment of the present invention.

FIG. 14 shows the timing chart of an eighth embodiment of the present invention. In this embodiment monitoring of the picture occurs for example every 1/60 sec. By supplying the power to the image pick-up system with the first step (33) of the two stroke switch the reading out of the picture is once stopped with the second stroke. The power starts to be supplied to the recording system and formation of the new picture is not started with the second stroke as in the first to the seventh embodiments. Hence a common circuit construction can be used for the motion picture mode.

The timing in FIG. 14 shows an example in which the image pick-up element shown in FIG. 5(b) is used. When the first step switch (33) is closed at the time t24 ordinary motion picture photography is carried out by the pulses φ4–φ6, while when the second step switch 34 is closed at the time t34 the power start being supplied to the recording system. On the other hand in synchronization with the synchronizing signal and immediately after the second step switch 34 is closed, the image formation in the light sensing part 25 is transferred to the storing portion so the reading out is stopped.

When then the level of the output of terminal F of the motor control circuit 11 goes high at the time t27, the charge memorized in the storing portion starts to be read out by the pulses φ5 and φ6 at the time t26 so as to be stored.

With the present embodiment constructed as mentioned above, one may stop reading out after the recording switch is closed till the recording system is stabilized.

What we claim:

1. A picture recording device, comprising:
   image pick-up means having a light sensing portion for converting an optical image into an electrical picture information signal;
   means for selectively shielding said light sensing portion during read-out of the electrical picture information;
   means for recording the electrical picture information on a recording medium;
   trigger means for starting powering said image pick-up means and said recording means;
   means for detecting a rise of said recording means; and
   control means for controlling said image pick-up means to form a first picture image signal in response to an actuation of said trigger means and store said first picture image signal until the rise of said recording means to provide a stored first picture image signal and controlling said recording means to record said stored first picture image signal after the rise of said recording means to thereby save power consumption and avoid loss of shutter chance.

2. A picture recording device in accordance with claim 1, wherein said image pick-up means has a memory portion for storing the electrical picture information, said picture recording device comprising means for varying timing of transferring of the electrical picture information from said light sensing portion to said memory portion.

3. A picture recording device, comprising:
   image pick-up means having a light sensing portion for converting an optical image into an electrical picture information signal;
   means for selectively shielding said light sensing portion during read out of the electrical picture information;
   means for recording the electrical picture information on a recording medium;
   trigger means for starting powering said image pick-up means and said recording means;
   means for detecting a rise of said recording means;
   power means for supplying power to said recording means; and
   control means for controlling said image pick-up means to form a first picture image signal in response to an actuation of said trigger means and store said first picture image signal until the rise of said recording means and controlling said reading means to read said first picture image signal from said image pick-up means after the rise of said recording means to be recorded by said recording means, thereby saving power consumption and avoiding loss of shutter chance.

4. A picture recording device in accordance with claim 1, wherein the detecting means includes a timer.

5. A device according to claim 3, wherein said image pick-up means is made of a semiconductor material.

6. A device according to claim 3, further including means for varying and controlling the time of the converting operation of said image pick-up means.

7. A device according to claim 3, wherein said control means transfers the electrical picture information signal produced in said light sensing portion to a prescribed portion in said image pick-up means so that light does not affect the electrical picture information signal in said image pick-up means until the rise of said recording means.

8. A recording apparatus, comprising:
   image pick-up means for photoconverting an optical image into an electrical signal;
   trigger means for starting powering said image pick-up means and said recording means;
   recording means for recording an output of said image pick-up means; and
   control means for controlling said image pick-up means to form a first picture image signal in response to an actuation of said trigger means, to store said first picture image signal until a rise of said recording means and to output said first picture image signal to be recorded by said recording means after the rise of said recording means, thereby saving power consumption and avoiding loss of shutter chance.

9. An apparatus according to claim 8, further comprising:
   shielding means for shielding said image pick-up means.

10. An apparatus according to claim 8, further comprising:
    common trigger means for powering said recording means and said image pick-up means.

11. An apparatus according to claim 8, wherein the rise of said recording means occurs when servo-locking is substantially completed a predetermined time after said recording means is powered.

12. A recording apparatus, comprising:
    image pick-up means for photoconverting an optical image into an electrical signal;
    trigger means for starting powering said image pick-up means and said recording means;
    recording means for recording an output of said image pick-up means; and
    control means for controlling said image pick-up means to form a first picture image signal in response to an actuation of said trigger means, to store said first picture image signal by shielding said image pick-up means at least until a rise of said recording means and to output said first picture image signal to be recorded by said recording means after the rise of said recording means, thereby saving power consumption and avoiding loss of shutter chance.

13. An apparatus according to claim 12, further comprising:
    shielding means for shielding said image pick-up means.

14. An apparatus according to claim 12, further comprising:
    common trigger means for powering said recording means and said image pick-up means.

15. An apparatus according to claim 12, wherein the rise of said recording means occurs a predetermined time after being powered.

* * * * *